United States Patent [19]

Friello

[11] 4,250,196

[45] Feb. 10, 1981

[54] CENTER-FILLED CHEWING GUMS

[75] Inventor: Dominick R. Friello, Danbury, Conn.

[73] Assignee: Life Savers, Inc., New York, N.Y.

[21] Appl. No.: 83,088

[22] Filed: Oct. 9, 1979

[51] Int. Cl.$^3$ .................................................. A23G 3/30

[52] U.S. Cl. ........................................ 426/5; 426/658; 426/804

[58] Field of Search .................... 426/3, 5, 548, 658, 426/660, 804

[56] References Cited

U.S. PATENT DOCUMENTS

| Re. 26,959 | 9/1970 | Conrad | 426/658 |
|---|---|---|---|
| 810,210 | 1/1906 | Laws | 426/5 |
| 4,157,402 | 6/1979 | Ogawa et al. | 426/5 |

FOREIGN PATENT DOCUMENTS

| 899143 | 5/1972 | Canada | 426/660 |
|---|---|---|---|
| 1469031 | 3/1977 | United Kingdom | 426/5 |

*Primary Examiner*—Jeanette M. Hunter
*Attorney, Agent, or Firm*—Lawrence S. Levinson; Burton Rodney

[57] ABSTRACT

Center-filled chewing gum is provided which includes as the center fill an aqueous solution containing hydrogenated starch hydrolysate which may function as both a sweetener and humectant for retarding increase in viscosity of the aqueous solution.

24 Claims, No Drawings

CENTER-FILLED CHEWING GUMS

BACKGROUND OF THE INVENTION

U.S. Pat. No. 3,894,154 to Graff et al discloses a center-filled chewing gum which includes as a liquid fill an aqueous solution having a dissolved solids portion, and a humectant for retarding increase in viscosity of the center fill. The dissolved solids portion may include invert sugar, sucrose and glucose, while the humectant is glycerine.

British Pat. No. 1,469,031 discloses a center-filled chewing gum similar to that disclosed in U.S. Pat. No. 3,894,154 except that in addition to glycerine, the humectant may be polyimonene, sorbitol solution, lecithin, dextrose, gum arabic, glyceryl monostearate, polyethylene glycol or propylene glycol.

Reissue Pat. No. 26,959 to Conrad discloses a sugar substitute which is a hydrogenated starch prepared by hydrogenating a saccharified starch having a dextrose equivalent of 15–75% and containing dextrines, until substantially no dextrose and maltose remain. U.S. Pat. No. 3,556,811 and Canadian Pat. No. 899,143 to Smith discloses sugarless foods including confections such as candies and chewing gum which contain hydrogenated starch hydrolysate.

DESCRIPTION OF THE INVENTION

In accordance with the present invention, there is provided a center-filled chewing gum piece which includes an enclosed cavity containing a liquid fill formed of an aqueous solution of a hydrogenated starch hydrolysate which may function as both sweetener and humectant to inhibit increase in viscosity of the liquid fill, as well as flavor and, optionally thickening agent and/or other sweeteners and/or humectants.

Surprisingly, it has been found that the hydrogenated starch hydrolysate retards increase in viscosity of the liquid center fill without the need for glycerin. Thus, the center-filled chewing gum of the invention will have an extended shelf-life.

The chewing gum of the invention will include a liquid fill formed of from about 15 to about 25%, and preferably from about 18 to about 23% by weight water, and from about 75 to about 93% and, preferably, from about 80 to about 88% by weight hydrogenated starch hydrolysate. In addition, the center fill may optionally contain flavor, for example, in the form of flavor oil, in an amount of from about 0.15 to about 0.35% by weight, and preferably, from about 0.2 to about 0.3% by weight, optionally, a thickener in an amount of from about 0.07 to about 10% by weight, and preferably from about 0.10 to about 8% by weight, and optionally, an additional humectant in an amount of from about 0 to about 10% by weight, and preferably from about 0.2 to about 6% by weight of the liquid fill.

Where the liquid fill is to include additional sweetener, such sweetener may comprise a sugar sweetener, a sugar alcohol, or the non-sugar sweeteners. In the case where the additional sweetener is a sugar, such sugar may be present in an amount of from about 2 to about 15% by weight, and preferably, from about 3 to about 10% by weight; where the additional sweetener is a sugar alcohol such as sorbitol, and/or mannitol or xylitol, the sugar alcohol may be present in an amount within the range of from about 5 to about 30% by weight, and preferably, from about 3 to about 15% by weight; where the additional sweetener is an artificial sweetener such as, for example, aspartame, cyclamate, or a saccharin, the artificial sweetener may be present in an amount of from about 0.03 to about 0.40% by weight, and preferably, from about 0.03 to about 0.30% by weight.

The liquid fill will generally contain from about 75 to about 85% by weight solids. The liquid fill itself will comprise from about 5 to about 16% by weight, and preferably, from about 7 to about 14% by weight of the final chewing gum piece.

The preferred liquid fill compositions in accordance with the present invention are as follows:

|  | Parts by Weight |
| --- | --- |
| Hydrogenated starch hydrolysate (on a dry basis) | 80–88 |
| Flavor | 0–0.35 |
| Thickener | 0.1–2 |
| Optional sweetener |  |
| sugar | 0–5 |
| sugar alcohol (on a dry basis) | 5–15 |
| artificial sweetener | 0–0.2 |
| Humectant | 3–6 |

Particularly preferred liquid fill compositions in accordance with the invention are as follows:

|  | Parts by Weight |
| --- | --- |
| Hydrogenated starch hydrolysate (dry basis) | 80 to 90 |
| Sorbitol solution (68–72% solids) | 5 to 20 |
| Propylene glycol | 0.1 to 8 |
| Pectin | 0.2 to 2 |

The hydrogenated starch hydrolysate may function as both sweetener and humectant and thus is particularly suitable for use in a sugarless liquid fill which will usually be employed in a sugar-free center-filled chewing gum.

The hydrogenated starches also referred to as hydrogenated starch hydrolysates employed herein may include those disclosed in Reissue Pat. No. 26,959 or U.S. Pat. No. 3,556,811 as well as various hydrogenated glucose syrups and/or powders which contain sorbitol, hydrogenated disaccharides, tri- to hexa-hydrogenated saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids are made of from about 4 to about 20% sorbitol, from about 20 to about 65% hydrogenated disaccharides (that is, maltitol), from about 15 to about 45% tri- to hepta-hydrogenated saccharides, and from about 10 to about 35% hydrogenated saccharides higher than hepta.

The thickening agents which may be optionally employed in the liquid fill may comprise synthetic or natural gums, such as carboxymethyl cellulose, pectins, alginates, namely, esters of alginic acid, such as propylene glycol alginate, agar, gum tragacanth, hydroxypropyl cellulose, hydroxyethyl cellulose, gelatin and the like.

As indicated, a separate humectant is not absolutely essential since the hydrogenated starch hydrolysate may function as a humectant. However, in most preferred embodiments, the liquid center formulation of the invention may also include a humectant, such as propylene glycol, polyethylene glycol, glyceryl monostearate, gum arabic, dextrose, lecithin, sorbitol solution, glycerin or polylimonene.

Flavors which are especially useful in the liquid fill comprise flavor oil, including acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the center fill.

As indicated, in addition to the hydrogenated starch hydrolysate, the liquid fill may include a natural sugar or non-sugar sweetener.

The term "natural sugar" includes one or more sugars or sugar containing material, or sugar alcohols, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose such as cane or beet sugar, lactose, maltose or cellobiose; polysaccharides, such as partially hydrolyzed starch, dextrin or corn syrup solids, or sugar alcohol, such as sorbitol, xylitol, mannitol or arabitol.

In addition, as mentioned hereinbefore, the hydrogenated starch hydrolysate may be employed together with an artificial sweetener such as sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The chewing gum portion of the center-filled chewing gum of the invention may comprise conventional sugarless or sugar-containing chewing gums. Inasmuch as the hydrogenated starch hydrolysate containing liquid center fill described herein will preferably be sugar-free, the center fill is especially suitable for use in conjunction with sugar-free chewing gum. An example of a particularly preferred chewing gum for use herein which has good extrusion properties as well as long shelf-life and long-term flexibility includes gum base; and as a plasticizer-sweetener combination, a hydrogenated starch hydrolysate, for example, as disclosed in U.S. Pat. No. Re. 26,959 and U.S. Pat. No. 3,556,811 (which is also used in the center-fill herein) and a major amount of sorbitol, optionally one or more other sugar alcohols, such as mannitol or xylitol; optionally one or more additional sweetening agents, such as sugar and/or non-sugar sweeteners such as any of those described above; and optionally additional flavoring materials, one or more softeners, emulsifiers and/or fillers. The preferred chewing gum itself does not require an aqueous plasticizer or syrup such as corn syrup, although such materials may be present, if desired.

The preferred chewing gum for use in forming the center-filled chewing gum of the present invention comprises a sugarless chewing gum wherein the hydrogenated starch hydrolysate is employed in combination with sorbitol powder, and optionally, liquid sorbitol, other sugar alcohols, such as mannitol and/or xylitol, and/or gum arabic. The hydrogenated starch hydrolysates will be employed in a weight ratio to the sorbitol powder of within the range of from about 0.9:1 to about 0.1:1, and preferably from about 0.6:1 to about 0.1:1. Such preferred sugarless compositions contain from about 2 to about 60%, and preferably from about 2 to about 20% by weight hydrogenated starch hydrolysate, and the sorbitol powder is present in an amount within the range of from about 10 to about 75%, and preferably from about 10 to about 65% by weight.

In one embodiment of the chewing gum, sorbitol syrup or solution may also be employed in a weight ratio of sorbitol powder:sorbitol solution of within the range of from about 6:1 to about 2:1. The sorbitol syrup may be present in an amount to provide from about 40 to about 70% by weight sorbitol and preferably from about 40 to about 60% sorbitol based on the weight of the final chewing gums. Use of the sorbitol in the form of the syrup or solution increases moisture content and thus softness of the gum.

In another embodiment of the chewing gum, gum arabic, preferably, in the form of a solution, is employed in combination with the hydrogenated starch hydrolysate and sorbitol powder to provide the binding characteristics for homogeneity. The gum arabic will normally be employed as aqueous solutions containing from 30 to about 50% gum arabic, so as to provide an amount of gum arabic of within the range of from about 3 to about 15%, and preferably from about 5 to about 10% by weight based on the weight of the chewing gum.

The chewing gum will also preferably include mannitol to provide the desirable texture characteristics. The mannitol will be present in an amount ranging from about 0 to about 20%, and preferably from about 3 to about 15% based on the weight of the chewing gum.

The hydrogenated starch hydrolysate employed in the chewing gum piece itself may include any of those described above with respect to the center fill.

Where the above-described hydrogenated starch hydrolysate is employed in combination with the sorbitol and optionally mannitol and/or gum arabic, the resulting gum has been found to have a soft, pliable texture superior to sugarless formulations containing no hydrogenated starch hydrolysate. In addition, such chewing gum composition, which usually will be of the non-sugar type, has good softness retention properties and improved flexibility as it ages on the shelf and has excellent extrusion properties.

The hydrogenated starch hydrolysate as described above may be employed as a substitute for corn syrup or other plasticizer or softener, sugar and even sugar alcohols. A typical sugar-free gum formulation may contain from about 2 to about 70%, and preferably from about 4 to about 60% by weight of the hydrogenated starch hydrolysate. Such formulations may include the hydrogenated starch hydrolysate in the form of a powder and/or aqueous syrup; where present, the syrup (2 to 25% hydrogenated starch) will be employed in a weight ratio to the powder of within the range of from about 0.2:1 to about 0.5:1, and preferably from about 0.2:1 to about 0.3:1. The use of the hydrogenated starch hydrolysate in syrup form, as in the case of the sugar alcohols, increases moisture content of the gum formulation and thereby enhances softness properties thereof.

The hydrogenated starch hydrolysate preferably in the form of its syrup, may also be employed in bubble gum formulations to produce a soft, pliable product, the degree of softness being controllable by changing the amount of syrup employed. In the bubble gum formulations of the invention, the hydrogenated starch hydrolysate may be employed with or without sugar (which when present will provide from about 10 to about 90% by weight of the bubble gum formulation) or with artificial or non-sugar sweeteners as described herein.

The chewing gum will include a relatively water-insoluble, water-impenetrable gum base in an amount ranging from about 8 to about 50%, and preferably from about 15 to 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
| --- | --- |
| Base I |  |
| Ester gum | 88 |
| Rubber latex solids | 10 |
| Lecithin | 2 |
| Base II |  |
| Chicle | 30 |
| Jelutong | 60 |
| Gutta soh | 8 |
| Lecithin | 2 |
| Base III |  |
| Partially oxidized chicle | 98 |
| Lecithin | 2 |
| Base IV |  |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc., Representative flavor oils of the type described above with respect to the liquid center-fill may also be employed in the chewing gum itself.

The chewing gum may contain a sugar sweetener or non-sugar sweetener as described above with respect to the center fill. Where present, the natural sugar or sugar alcohol may be employed in an amount ranging from about 90 to about 0.05% by weight of the gum.

The chewing gum may also contain conventional ester gums, polydextrose, fillers, such as calcium carbonate, and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D.&C. coloring agents, and other conventional chewing gum additives as will be apparent to those skilled in the art.

The chewing gum itself may be prepared employing conventional chewing gum manufacturing techniques. However, the various sweeteners and/or hydrogenated starch hydrolysate may be provided in a form to ensure relatively slow release or slow solubilization in the saliva. Thus, for example, the sweetener and/or hydrogenated starch hydrolysate may be coated with, integrated with or encapsulated with non-toxic water-insoluble polymeric substances such as polyvinyl esters disclosed in U.S. Pat. Nos. 3,826,847 and 3,795,744, organic acids as disclosed in U.S. Pat. No. 3,761,288, or other known edible materials as, for example, any of the fusing agents disclosed in U.S. Pat. No. 3,928,633, as well as hydrophilic colloids such as ethyl cellulose, paraffin wax or sodium alginate. The sweetener and/or hydrogenated starch hydrolysate so-modified and employed in conjunction with conventional carriers as described above, will be slowly solubilized in the saliva over extended periods of time.

Alternatively, where it is desired to achieve slow release, the hydrogenated starch hydrolysate and/or other sweetener (where employed) will be in particulate form having an average particle size of below about 150 microns (0.150 mm or about 100 mesh), and will be incorporated into the gum base portion of the chewing gum. The particulate compound will be substantially retained in the gum base, and during chewing undergoes slow and controlled release into the saliva.

The preferred chewing gum for use in the present invention may be prepared by admixing melted gum base (heated at, for example, 160°–170° F.), softener, such as lecithin, and color, if desired, optionally adding polyol sweetener, such as mannitol, to the mix, and mixing for 2–5 minutes, adding hydrogenated starch hydrolysate alone or optionally with gum arabic and/or glycerine and mixing for 2 to 7 minutes, adding a portion of the sorbitol and a portion of the flavor while mixing for 2 to 5 minutes, and thereafter repeating the last step adding additional portions of sorbitol and flavor until all the sorbitol and flavor have been added, and then optionally adding spray-dried flavor and mixing the entire mass for 2 to 5 minutes.

If desired, the above may be mixed with one or more easily extractable water-soluble sweeteners, such as natural sugar, soluble saccharin salts, aspartame, water-soluble food acid and/or flavors. The resulting mix is then formed into sticks or tablets of chewing gum employing conventional techniques.

Where, in the above method, it is desired to employ a soluble non-sugar sweetener in a chewing gum containing an aqueous plasticizer (such as the hydrogenated starch in syrup form), the soluble non-sugar sweetener will be added to the gum base ingredients before the aqueous plasticizer is added thereto. In this manner, the soluble non-sugar sweetener will be transferred to the gum base and will not be first dissolved in the plasticizer.

Regardless of the solubility of the non-sugar sweetener to be added, where long lasting flavor or sweetness is desired, whether it be the hydrogenated starch hydrolysate and/or other sweetener, it is preferred that the particles of non-sugar sweetener have an average particle size of less than 150 microns to ensure slow controlled release into the saliva.

Preferred sugarless chewing gums for use in accordance with the present invention wherein the hydrogenated starch hydrolysate is employed as a sugar substitute will have the following compositions:

|  | Parts by Weight |
| --- | --- |
| Gum base | 18–35 |
| Mannitol | 0–18 |
| Flavor | 0.5–2.5 |
| Sorbitol powder | 30–65 |
| Softener (e.g., lecithin) | 0.5–2 |
| Hydrogenated starch hydrolysate (on dry basis) | 3–20 |
| Gum arabic (based on 30–70% solution) | 0–12 |
| Glycerine | 0–4 |
| Sorbitol solution (based on 40 to 70% solution) | 0–25 |

Preferred sugarless chewing gum formulations for use in accordance with the present invention wherein hydrogenated starch hydrolysate is the sole binding agent and aid in processing are as follows:

|  | Parts by Weight |
| --- | --- |
| Gum base | 20–35 |
| Mannitol | 6–18 |
| Flavor oil | 0.5–2.5 |
| Sorbitol powder | 30–55 |
| Softener (e.g., lecithin) | 0.5–2 |
| Hydrogenated starch hydrolysate (on dry basis) | 10–18 |
| Glycerine | 0–4 |

Preferred sugarless chewing gum formulations for use in accordance with the present invention wherein hydrogenated starch hydrolysate is employed in conjunction with gum arabic solutions to aid in extrusion are as follows.

|  | Parts by Weight |
| --- | --- |
| Gum base | 18–30 |
| Mannitol | 0–10 |
| Flavor oil | 0.5–2.5 |
| Sorbitol powder | 40–65 |
| Softener (e.g., lecithin) | 0.5–2 |
| Gum arabic solution (40 to 60% gum arabic) | 4–10 |
| Hydrogenated starch hydrolysate | 5–12 |
| Glycerine | 1–4 |

Preferred sugarless chewing gums for use in accordance with the present invention wherein the hydrogenated starch hydrolysate is employed in conjunction with sorbitol solution (as plasticizer) will have the following compositions:

|  | Parts by Weight |
| --- | --- |
| Gum base | 18–30 |
| Hydrogenated starch hydrolysate (powder) | 5–12 |
| Mannitol | 0–10 |
| Sorbitol powder | 40–60 |
| Sorbitol liquid (50 to 80% solution) | 10–20 |
| Glycerine | 0–4 |
| Softener (lecithin) | 0.5–2 |
| Flavor | 0.5–2.5 |

Preferred sugarless gum formulations for use in accordance with the present invention are as follows:

|  | Parts by Weight |
| --- | --- |
| Gum base | 18–25 |
| Mannitol | 0–10 |
| Hydrogenated starch hydrolysate | 10–20 |
| Sorbitol powder | 40–60 |
| Softener (lecithin) | 0.5–1.5 |
| Glycerine | 1–3 |
| Flavor | 0.3–1.5 |

Again, the above sugarless chewing gum is particularly suitable for use in making liquid center chewing gum of the invention. However, other conventional sugar-containing or sugarless chewing gum compositions may be employed.

The center-filled chewing gum of the invention may be prepared as described in U.S. Pat. Nos. 3,806,290 and 3,857,963.

The following Examples illustrate preferred embodiments of the present invention without, however, limiting the same thereto. All temperatures are expressed in °F.

EXAMPLE 1

A. A center fill for chewing gum in accordance with the present invention is prepared by dispersing pectin in water, adding sorbitol solution (70%) and mixing thoroughly. Thereafter, hydrogenated starch hydrolysate (formed of 75% solids including 7% sorbitol and 25% maltitol) is added slowly with mixing. The mixture is then heated to drive off moisture to form a solution having 76% by weight solids dissolved therein. Flavor oil is then added together with propylene glycol and coloring to form the center fill having the following composition.

|  | Parts by Weight |
| --- | --- |
| Hydrogenated starch hydrolysate | 84 |
| Sorbitol solution | 10 |
| Propylene glycol | 5 |
| Pectin X-5431 (Hercules Powder Co.) | 1 |
| Flavor oil | 0.4 |
| Color | 0.1 |

B. A sugarless chewing gum is prepared from the following ingredients:

|  | Parts by Weight |
| --- | --- |
| Gum base | 30 |
| Mannitol | 15 |
| Soribitol powder | 40 |
| Hydrogenated starch hydrolysate powder (75% solids, |  |

| | Parts by Weight |
|---|---|
| including 8% sorbitol and 8% maltitol) | 12 |
| Softener (lecithin) | 1 |
| Spearmint oil | 1 |
| Color | 0.1 |

The gum base is melted (160°–175° F.) and placed in pre-heated standard dough mixer equipped with sigma blades. Lecithin and color are added and mixed for 4–5 minutes. Hydrogenated starch hydrolysate powder is added and mixed for 4–5 minutes. Thereafter, about one-third of the sorbitol is slowly added followed immediately with one-third of the flavor and mixed for about 2–3 minutes. The last step is repeated until all sorbitol and flavor are added.

C. The center-filled gum formed from the above chewing gum portion and center fill is prepared employing the procedure outlined in U.S. Pat. No. 3,857,963.

The center-filled chewing gum so-prepared is found to have excellent sweetness and flavor and a long shelf-life. In fact, the center fill itself is found to maintain good liquid integrity after four months at room temperature.

EXAMPLES 2 AND 3

Sugarless center-filled chewing gums are prepared from the following ingredients employing the procedure outlined in Example 1 except that glycerine is added directly after the hydrogenated starch hydrolysate in making the chewing gum portion, and the propylene glycol humectant is removed and in Example 3 sorbitol is replaced by xylitol solution.

| | Parts by Weight | |
|---|---|---|
| | Ex. 2 | Ex. 3 |
| Gum portion | | |
| Gum base | 22 | 24 |
| Mannitol | 8 | 10 |
| Sorbitol powder | 50 | 47 |
| Hydrogenated starch hydrolysate syrup (on dry basis) | 16 | 15 |
| Glycerine | 2 | 2 |
| Lecithin | 0.5 | 0.5 |
| Fruit flavor | 1.5 | 0 |
| Spearmint flavor | 0 | 1.2 |
| Color | 0.05 | 0.1 |
| Center fill portion | | |
| Hydrogenated starch hydrolysate | 86.3 | 89 |
| Flavor oil | 0.4 | 0.4 |
| Sorbitol solution (70%) | 13.5 | — |
| Pectin | 0.8 | 0.6 |
| Xylitol solution (50%) | — | 10 |

The Examples 2 and 3 chewing gums are found to have a pleasant sweet taste, good softness retention, improved flexibility properties and excellent extrusion properties, and excellent shelf-life.

EXAMPLES 4 TO 7

Sugarless chewing gums are prepared from the following ingredients.

| | Parts by Weight | | | |
|---|---|---|---|---|
| | Ex. 4 | Ex. 5 | Ex. 6 | Ex. 7 |
| Chewing gum portion | | | | |
| Gum base | 22 | 22 | 22 | 22 |
| Sorbitol powder | 54 | 48 | 47 | 48 |
| Sorbitol solution (70%) | 13 | 12 | 12 | 12 |
| Hydrogenated starch hydrolysate | 8.5 | 8 | 10 | 8 |
| Mannitol | — | 8 | 5 | 8 |
| Lecithin | 0.5 | 0.5 | 0.5 | 0.5 |
| Flavor | 1.7 | 1.6 | 1.2 | 1.6 |
| Color | 0.07 | 0.05 | 0.1 | 0.05 |
| Glycerine | — | — | 2 | — |
| Center fill portion | | | | |
| Hydrogenated starch hydrolysate | 85 | 87 | 88 | 87 |
| Sorbitol solution (70%) | 10 | 8 | — | 11 |
| Xylitol solution (50%) | — | 4 | 10 | — |
| Propylene glycol | 5 | 3 | 2 | 2 |
| Flavor | 0.4 | 0.3 | 0.3 | 0.5 |

A procedure similar to that described in Examples 1 to 3 is employed except that pectin is eliminated.

The above chewing gums are found to have properties similar to that of the Examples 1 to 3 gums.

What is claimed is:

1. A center-filled chewing gum having improved softness retention, flexibility, and excellent shelf-life comprising a chewing gum piece including an enclosed cavity therein, and a liquid fill in said cavity, said liquid fill including an aqueous solution consisting essentially of hydrogenated starch hydrolysate as a sweetener and humectant, said hydrogenated starch hydrolysate being present as a solid in the liquid fill in an amount of from about 75 to about 93% by weight of the liquid fill.

2. The center-filled chewing gum as defined in claim 1 wherein the hydrogenated starch hydrolysate is formed of from about 4 to about 20% sorbitol, from about 20 to about 65% hydrogenated disaccharides, from about 15 to about 45% tri- to hepta-hydrogenated saccharides and from about 10 to about 35% hydrogenated saccharides higher than hepta.

3. The center-filled chewing gum as defined in claim 1 wherein said liquid fill includes, in addition, a thickener.

4. The center-filled chewing gum as defined in claim 3 wherein said thickener is of the natural or synthetic gum type.

5. The center-filled chewing gum as defined in claim 4 wherein said thickener is carboxymethyl cellulose, pectin, an alginate, agar, gum tragacanth, hydroxypropyl cellulose, hydroxyethyl cellulose, or gelatin.

6. The center-filled chewing gum as defined in claim 3 wherein said thickener is present in an amount of from about 0.07 to about 10% by weight of the liquid fill.

7. The center-filled chewing gum as defined in claim 1 wherein said liquid fill includes, in addition, another sweetener.

8. The center-filled chewing gum as defined in claim 7 wherein said another sweetener is a sugar, a sugar alcohol, artificial sweetener, or mixtures thereof.

9. The center-filled chewing gum as defined in claim 8 wherein said sugar alcohol is sorbitol, mannitol, xylitol or mixtures thereof.

10. The center-filled chewing gum as defined in claim 1 including, in addition, another humectant.

11. The center-filled chewing gum as defined in claim 10 wherein said humectant is present in an amount within the range of from 0 to about 10% by weight of the liquid fill.

12. The center-filled chewing gum as defined in claim 10 wherein said another humectant is pectin, propylene glycol, polyethylene glycol, glyceryl monostearate, gum arabic, dextrose, lecithin, sorbitol, glycerine, polylimonene or mixtures thereof.

13. The center-filled chewing gum as defined in claim 1 wherein said liquid fill is sugarless.

14. The center-filled chewing gum as defined in claim 1 wherein said liquid fill contains a sugar.

15. The center-filled chewing gum as defined in claim 1 wherein said liquid fill further includes another sweetener, another humectant and a thickener.

16. The center-filled chewing gum as defined in claim 15 wherein said another sweetener is sorbitol, said another humectant is propylene glycol and said thickener is pectin.

17. The center-filled chewing gum as defined in claim 16 wherein said hydrogenated starch hydrolysate is present in the liquid fill in an amount within the range of from about 80 to about 90 parts by weight, said sorbitol in the form of sorbitol solution (68 to 72% solids) is present in the liquid fill in an amount within the range of from about 5 to about 20 parts by weight, said propylene glycol is present in the liquid fill in an amount within the range of from about 0.1 to about 8 parts by weight, and said pectin is present in the liquid fill in an amount within the range of from about 0.2 to about 2 parts by weight.

18. The center-filled chewing gum as defined in claim 1 wherein said liquid fill comprises from about 75 to about 85% by weight solids.

19. The center-filled chewing gum as defined in claim 1 wherein said liquid fill comprises from about 5 to about 16% by weight of said chewing gum piece.

20. A liquid fill for center-filled chewing gum, said liquid fill comprising a hydrogenated starch hydrolysate as a sweetener and humectant.

21. The liquid fill as defined in claim 20 further including another sweetener, another humectant and a thickener.

22. The center-filled chewing gum as defined in claim 21 wherein said another sweetener is sorbitol, said another humectant is propylene glycol and said thickener is pectin.

23. The center-filled chewing gum as defined in claim 22 wherein said hydrogenated starch hydrolysate is present in the liquid fill in an amount within the range of from about 80 to about 90 parts by weight, said sorbitol in the form of sorbitol solution (68 to 72% solids) is present in the liquid fill in an amount within the range of from about 5 to about 20 parts by weight, said propylene glycol is present in the liquid fill in an amount within the range of from about 0.1 to about 8 parts by weight, and said pectin is present in the liquid fill in an amount within the range of from about 0.2 to about 2 parts by weight.

24. The center-filled chewing gum as defined in claim 20 wherein said liquid fill comprises from about 75 to about 85% by weight solids.

* * * * *